July 29, 1958     R. A. FRYKLUND     2,845,513
ECHO-RANGING DEVICES

Filed April 12, 1951                  3 Sheets-Sheet 1

INVENTOR
ROBERT A. FRYKLUND
BY
ATTORNEY

July 29, 1958 R. A. FRYKLUND 2,845,513
ECHO-RANGING DEVICES
Filed April 12, 1951 3 Sheets-Sheet 3
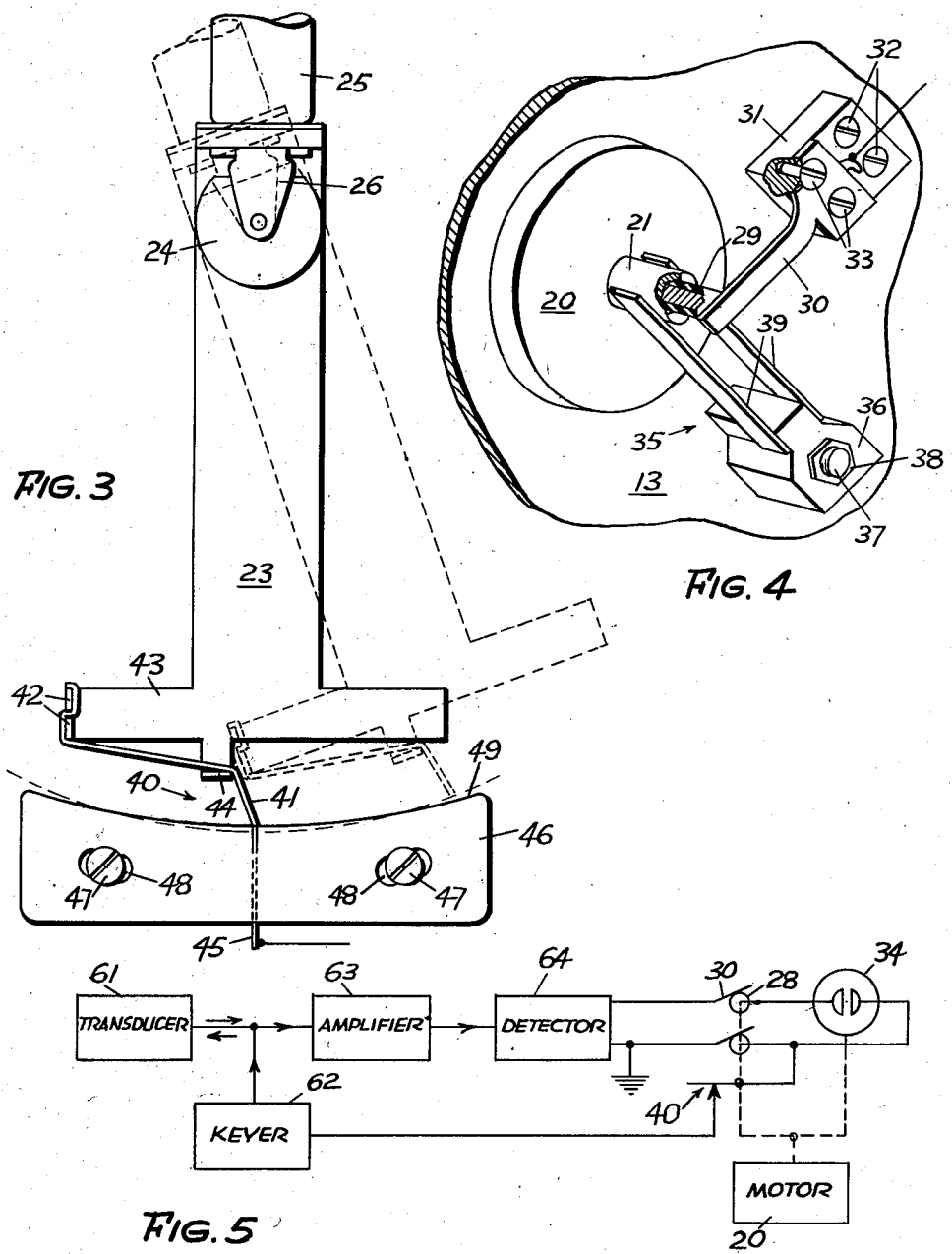
INVENTOR
ROBERT A. FRYKLUND
BY
ATTORNEY United States Patent Office 2,845,513
Patented July 29, 1958

2,845,513

ECHO-RANGING DEVICES

Robert A. Fryklund, Dedham, Mass., assignor to Raytheon Manufacturing Company, Newton, Mass., a corporation of Delaware Application April 12, 1951, Serial No. 220,684

4 Claims. (Cl. 200—164)

This invention relates to echo-ranging devices, and more particularly to improved details of apparatus used for sonic underwater depth sounding. Sonic depth sounders have been used for many years by marine craft for various purposes, such as navigation and location of fish. However, due to the expense of the equipment incurred by the initial installation of the equipment and the subsequent maintenance thereof, the use of sonic depth sounders has been largely limited to relatively large size craft.

This invention discloses constructional details of a sonic depth sounder which permit production of an inexpensive yet reliable apparatus. Briefly, this invention provides for an indicator comprising a neon lamp mounted on a rotating arm, said arm being directly connected to the shaft of an electric motor. While previous depth sounding equipment used neon-indicating lights rotating in a circle, this rotation was accomplished by an arm driven through a gear train from a motor. Such an arrangement was expensive, and, in addition, backlash in the gear train produced jitter in the echo signal indications. By directly connecting the movable arm carrying the indicator to the motor shaft, a relatively inexpensive device may be produced having improved performance characteristics over previous designs.

This invention further discloses a novel type of keyer switch. Briefly, this switch comprises a first contact resiliently mounted on an extension of the arm which is connected to the motor shaft. A second contact is stationarily mounted in an insulating block, said block having a curved surface whose radius of curvature is somewhat greater than the radius of curvature of the average path of the first contact. The second contact is mounted flush with the curved surface of the insulating block, such that, as the movable contact swings by the insulating block, it gradually approaches the curved surface thereof and rubs on the insulating block for a short distance during which it passes over the second contact and makes contact therewith for a short predetermined time. Since the approach of the first contact to the curved surface of the insulating block is gradual, the accelerating force applied to the first contact, upon striking the insulating block, is relatively small, such that no bouncing of the contact on the insulating block or over the second contact occurs. Accordingly, a reliable electrical circuit is made between the first and second contacts once during every rotation of the motor shaft. Since the first contact rubs against the insulating block or the second contact for only a small portion of its circular path, the average frictional drag of this contact is extremely small, thereby permitting the use of a relatively small motor to drive the arm carrying the contact and the indicator.

This invention further discloses that the shaft of the motor may be made hollow, said hollow shaft containing an electrical conductor insulated therefrom. One end of the conductor is connected to one side of the neon lamp, the other side of which may be connected to the shaft. The other end of the conductor is connected to a movable contact which rotates with the shaft and continuously engages a stationary contact. Since the point of engagement of the movable contact and the substantially stationary contact is coaxial with the shaft, the frictional drag between the movable contact and the stationary contact is reduced to a minimum. Accordingly, a very low frictional drag is placed on the motor by these contacts.

This invention further discloses a novel grounding contact for the motor shaft. While the shaft is grounded through the shaft bearings, such grounding is unreliable and intermittent, due to lubricant in the bearings. Accordingly, a grounding contact is produced between the shaft and the chassis of the apparatus by a pair of fingers positioned in contact with opposite sides of the shaft and resiliently urged together. This is accomplished by making the fingers of resilient material and connecting one end of each finger to a support block, for example, by soldering, and positioning the other ends of the fingers in contact with the shaft. Since a finger is positioned on either side of the shaft, reliable contact may be had therewith, even though the support block becomes slightly misadjusted, due to vibration or bearing wear, et cetera.

Other and further objects and advantages of this invention will become apparent as the description thereof progresses, reference being had to the accompanying drawings, wherein:

Fig. 3 is an enlarged view, illustrating the details of the arm and keying switch contacts;

Fig. 4 is an enlarged perspective view of the contacts through which the signal is fed to the conductor in the hollow shaft of the motor and thence to the indicating lamp on the arm, and the grounding contact for the motor shaft; and Fig. 5 illustrates a functional flow diagram of the electrical circuit used in the device, illustrated in Figs. 1 through 4.

Figure 1:
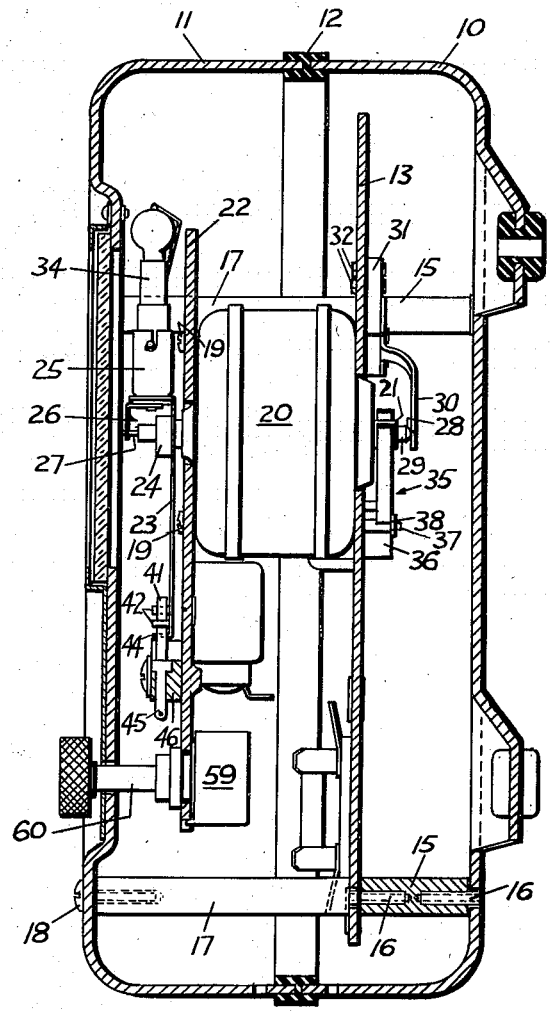
Fig. 1 illustrates a longitudinal, cross-sectional view of an apparatus embodying this invention looking toward the apparatus from the side thereof, for example, a view taken along line 1—1 of Fig. 2.
Figure 2:
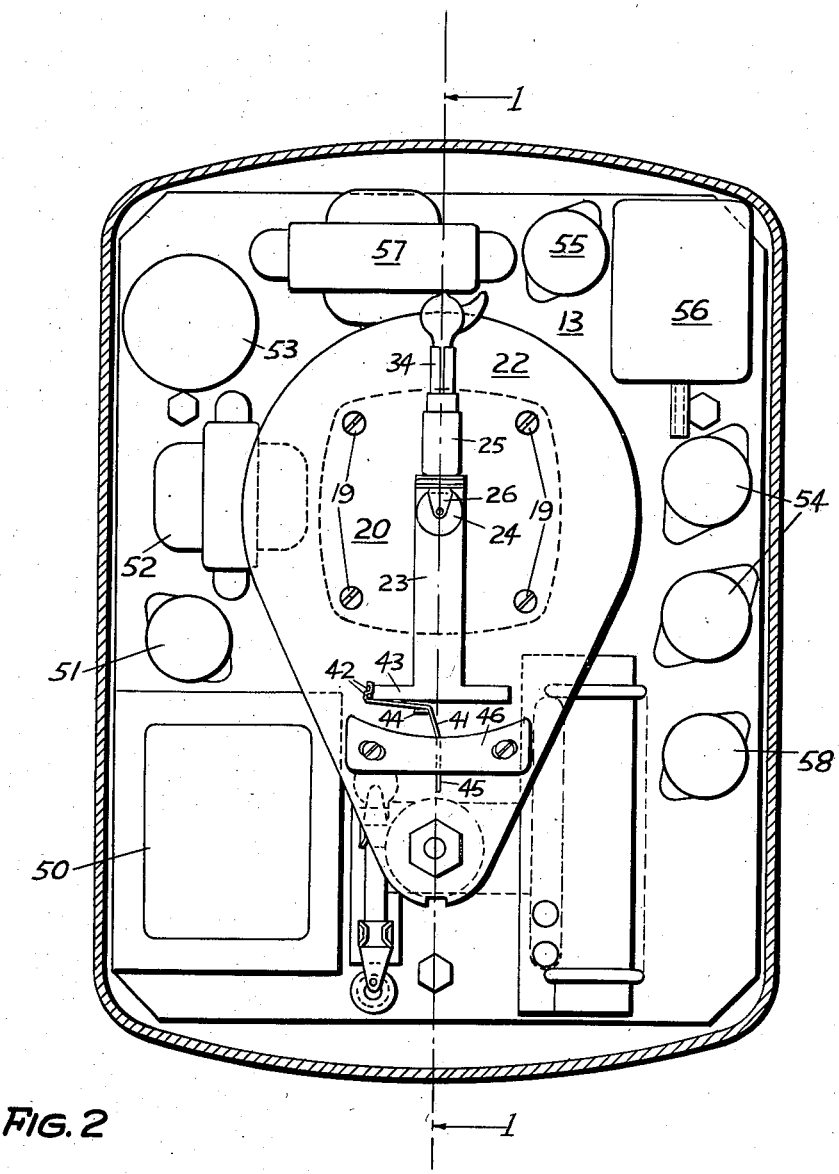
Fig. 2 represents a front view of the device with the front cover removed, illustrating positioning of the various components of the device.

Referring now to Figs. 1 through 4, there is shown a metallic case comprising a back portion 10 and a front portion 11 joined thereto by a rubber gasket 12. A plate 13 is supported with respect to the back surface of the back case member 10 by means of spacers 15 attached to member 10 and plate 13 by screws, as at 16. Additional spacers 17 extend from plate 13 forward to the front case member 11 and are attached thereto, as by screws 18. By removing the screws 18, front cover member 11 may be removed from the apparatus.

Bolted to the front side of plate 13, for example, by its assembly bolts 19, is an electric motor 20 having a shaft 21 extending out either end thereof. One end of shaft 21 extends through a hole in plate 13, and the other end of shaft 21 extends through a hole in a plate 22 which is positioned substantially parallel to plate 13, and is attached to motor 20, for example, by the assembly bolts. The end of shaft 21 which extends through plate 22 has rigidly attached thereto an arm 23 by means of a nut 24 threadedly engaging shaft 21. Attached to one end of arm 23 is a lamp socket 25, one terminal of which is electrically connected to arm 23, the other terminal 26 of socket 25 being connected to a conductor 27 which extends through shaft 21 coaxial therewith. The other end of conductor 27 is attached to a metallic contact, as at 28, and is rigidly supported with respect to shaft 21 by means of insulating material 29 surrounding conductor 27 inside shaft 21. Contact 28 engages a substantially stationary contact 30, contact 30, in turn, being supported by an insulating block 31 attached to plate 13 by screws 32. Contact 30 is rigidly fastened to block 31 by means of screws 33, and comprises an elongated flexible portion, the unattached end of which resiliently bears against contact 28. The signal for the indicator is fed to contact 30 and thence through contact 28, conductor 27, socket terminal 26 to one side of a neon lamp 34 positioned in socket 25. The other side of the neon lamp is connected through the outer case of the socket 25, the arm 23, and the motor shaft 21 to a grounding contact 35 positioned on the opposite side of plate 13 from the motor 20 and bearing on a portion of the shaft 21 which extends through plate 13. Grounding contact 35 comprises a support member 36 rigidly attached by means of a motor assembly bolt 37 and nut 38 to the plate 13. Extending toward shaft 21 from the support member 36 is a pair of resilient fingers 39, one end of each of said fingers being rigidly attached to support member 36, for example, by soldering or welding, and the other ends of said fingers being positioned, respectively, in contact with opposite sides of shaft 21. Fingers 39 are so attached to support member 36 that their unattached ends are resiliently urged together, thereby making positive contact with the shaft 21.

Referring now to Fig. 3, there is shown the details of a keyer switch 40. Switch 40 comprises a movable contact 41 resiliently mounted on the opposite end of arm 23 from that to which the neon lamp socket 25 is attached. Contact 41 comprises a flat spring-like member, one end of which is bent at a plurality of substantially right-angle turns to engage a pair of supporting fingers 42 struck up from a projection 43 at the outer end of arm 23. Fingers 42 are so positioned, and contact member 41 is so bent, that the contacting portion thereof is urged radially outwardly from the shaft 21. Outward motion of the spring contact 41 is limited by a stop 44 comprising a struck-up portion of an extension of arm 23. Positioned below shaft 21 at a point slightly less than the distance of the contacting portion of contact 41 from shaft 21 is a stationary contact 45. Contact 45 comprises a flat planar metallic member extending radially from the shaft 21. Contact 45 is embedded in a block of insulating material 46 which is fastened to plate 22 by means of screws 47 which pass through slotted holes 48 in block 46 to allow positional adjustment of block 46. The upper surface of block 46 has a curved contour, as at 49, the radius of curvature of said surface being slightly greater than the radius of curvature of the path described by the contacting surface of contact 41 as arm 23 is rotated. The center of curvature of surface 49 rests on a line which intersects the axis of shaft 21 and contact 45. The upper edge of contact 45 is positioned flush with the curved surface 49, such that, as the arm 23 is rotated, the contact 41 approaches the curved surface 49, gradually striking said surface a short distance before it touches stationary contact 45. When contact 41 strikes the curved surface 49 and is pushed radially inward, contact 41 will positively engage the exposed portion of the contact 45 as it passes thereover. Furthermore, the static force with which the resilient contact 41 is urged against the block 46 and contact 45 may be made extremely small when the arm 23 is rotating very slowly, as, for example, when the apparatus has been just turned on and the motor is coming up to speed, since, when the motor comes up to speed, centrifugal force will urge the contact 41 radially outwardly, thereby providing sufficient contacting force. This permits the use of a relatively low starting torque motor such as is generally encountered in a synchronous motor.

It may be seen that the constructional details heretofore described permit the construction of an extremely small yet reliable depth sounding device, wherein all the components, except the sound transducer, are positioned within a single case. For example, as may be seen herein, the major components, such as the power transformer 50, rectifier tube 51, filter choke 52, filter capacitor 53, amplifying tubes 54, detecting tube 55, band-pass filter 56, signal output transformer 57, and keyer tube 58, are mounted on plate 13 surrounding motor 20. The sensitivity potentiometer 59 is mounted on plate 22, and the control arm 60 thereof extends out through the front cover 11. Other minor components, not shown, are suitably placed in any desired position, there being adequate space in the remaining area surrounding the motor and the space between plate 13 and the back wall of the back case member 10. Thus, it may be seen that a structurally rigid, easily accessible, well protected chassis layout may be produced in accordance with this invention.

Referring now to Fig. 5, there is shown a functional flow diagram of one species of an electrical system in which the components and apparatus illustrated in Figs. 1 through 4 may be used. A transducer 61 is positioned to transmit sonic energy into a water body and receive sonic echo signals therefrom. Transducer 61 is periodically energized for a short period of time by a keyer 62 which may comprise keyer tube 58 in response to the closing of switch 40 which is mechanically actuated by motor 20. Upon being energized, transducer 61 transmits sonic energy signals through the water. Echo signals from objects in the water, such as fish or the bottom of the water, are reflected back to transducer 61 where they are fed through an amplifier 63 which may comprise tubes 54, a detector 64 which may comprise the band-pass filter 56 and the detector tube 55, and through contacts 30 and 28 to the neon indicator lamp 34 which is being rotated by the motor 20. The position of the lamp when it receives the echo signals from the transducer 61 indicates the distance from the transducer of the body producing the echo signals, according to well-known practice.

This completes the description of the embodiment of the invention illustrated herein. However, many modifications thereof will be apparent to persons skilled in the art without departing from the spirit and scope of this invention. For example, the indicator need not necessarily be a neon lamp, but may be a stylus for use with recording paper. The keyer and transducer arrangement may be of any desired type, such as the prestressed type disclosed in my copending application Serial No. 220,792, filed April 13, 1951, now Patent No. 2,725,547, issued November 29, 1955, or the more conventional oscillator driven type, and the motor 20 need not necessarily be an electric motor, but may be any desired source of motion, such as a mechanical spring-driven arrangement. Accordingly, it is desired that this invention be not limited by the particular details, as illustrated herein, except as defined by the appended claims.

What is claimed is:

1. In combination, an electric motor comprising a hollow rotatable shaft carrying the rotor of said motor, an electrical conductor extending through said shaft, said conductor being insulated from said shaft, one end of said conductor being connected to a movable contact which is adapted to continuously engage a substantially stationary contact, an arm connected to the opposite end of said shaft, a first contact mounted on said arm, and a second contact embedded in an insulating member, said insulating member having a curved surface, said second contact being located between the ends of said curved surface, the contacting surface of said second contact being substantially flush with said curved surface, said curved surface further having a radius of curvature which is greater than the average radius of curvature of the path of said first contact such that said first contact is adapted to engage said curved surface and said second contact only over a limited portion of the rotational cycle of said arm.

2. In combination, a motor comprising a hollow rotatable shaft, an electrical conductor extending through said shaft, said conductor being insulated from said shaft, one end of said conductor being connected to a movable contact which is adapted to continuously engage a substantially stationary contact, the other end of said conductor being connected to a signal indicator, an arm connected to the opposite end of said shaft, a first contact mounted on said arm, and a second contact embedded in an insulating member, said insulating member having a curved surface, said second contact being located between the ends of said curved surface, the contacting surface of said second contact being substantially flush with said curved surface, said curved surface further having a radius of curvature which is greater than the average radius of curvature of the path of said first contact such that said first contact is adapted to engage said curved surface and said second contact only over a limited portion of the rotational cycle of said arm.

3. In combination, a rotatable shaft, an arm attached to said shaft, a first contact mounted on said arm, a second contact embedded in an insulating member, said insulating member having a curved surface, said second contact being located between the ends of said curved surface, the contacting surface of said second contact being substantially flush with said curved surface, said curved surface further having a radius of curvature which is greater than the average radius of curvature of the path of said first contact such that said first contact is adapted to engage said curved surface and said second contact only over a limited portion of the rotational cycle of said arm, and a stationary electrical contact adapted to resiliently engage said shaft, said contact comprising a pair of conductive members positioned in contact with opposite sides of said shaft, and resiliently urged together.

4. In combination, an electric motor comprising a hollow rotatable shaft carrying the rotor of said motor, an electrical conductor extending through said shaft, one end of said conductor being connected to a movable contact which is adapted to continuously engage a substantially stationary contact, an arm connected to the opposite end of said shaft, a first contact mounted on said arm, a second contact embedded in an insulating member, said insulating member having a curved surface, said second contact being located between the ends of said curved surface, the contacting surface of said second contact being substantially flush with said curved surface, said curved surface further having a radius of curvature which is greater than the average radius of curvature of the path of said first contact such that said first contact is adapted to engage said curved surface and said second contact only over a limited portion of the rotational cycle of said arm, and a stationary electrical contact adapted to resiliently engage said shaft, said contact comprising a pair of conductive members positioned in contact with opposite sides of said shaft, and resiliently urged together.

References Cited in the file of this patent

UNITED STATES PATENTS

| Number | Name | Date |
|---|---|---|
| 267,144 | Brougham | Nov. 7, 1882 |
| 898,370 | Jacobson | Sept. 8, 1908 |
| 937,522 | Haniquet | Oct. 19, 1909 |
| 1,166,923 | Neeley | Jan. 4, 1916 |
| 1,296,420 | Miller | Mar. 4, 1919 |
| 1,491,743 | Bradfield | Apr. 22, 1924 |
| 1,667,540 | Dorsey | Apr. 24, 1928 |
| 1,669,372 | Despard | May 8, 1928 |
| 1,677,943 | Williams | July 24, 1928 |
| 1,885,652 | Touly | Nov. 1, 1932 |
| 1,972,889 | Hayes | Sept. 11, 1934 |
| 2,071,284 | Hyland | Feb. 16, 1937 |
| 2,355,502 | Barton | Aug. 8, 1944 |